(12) United States Patent
Hart et al.

(10) Patent No.: US 8,335,173 B2
(45) Date of Patent: Dec. 18, 2012

(54) INSERTING TIME OF DEPARTURE INFORMATION IN FRAMES TO SUPPORT MULTI-CHANNEL LOCATION TECHNIQUES

(75) Inventors: Brian Donald Hart, Sunnyvale, CA (US); Paul J. Stager, Akron, OH (US); Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 848 days.

(21) Appl. No.: 12/168,250

(22) Filed: Jul. 7, 2008

(65) Prior Publication Data

US 2009/0257426 A1    Oct. 15, 2009

Related U.S. Application Data

(60) Provisional application No. 61/044,070, filed on Apr. 11, 2008.

(51) Int. Cl.
*H04B 7/00* (2006.01)
(52) U.S. Cl. ......................................... 370/310
(58) Field of Classification Search ........................ None
See application file for complete search history.

(56) References Cited

U.S. PATENT DOCUMENTS

| | | | |
|---|---|---|---|
| 5,381,150 A * | 1/1995 | Hawkins et al. | 342/13 |
| 5,515,062 A * | 5/1996 | Maine et al. | 342/457 |
| 5,812,528 A * | 9/1998 | VanDervort | 370/235 |
| 6,031,490 A * | 2/2000 | Forssen et al. | 342/457 |
| 6,473,619 B1 | 10/2002 | Kong et al. | |

(Continued)

FOREIGN PATENT DOCUMENTS

EP    1587255 A1    10/2005

(Continued)

OTHER PUBLICATIONS

International Search Report and Written Opinion dated Jul. 30, 2009; cited in PCT/US2009/037490.

*Primary Examiner* — Fan Ng
(74) *Attorney, Agent, or Firm* — Edell, Shapiro & Finnan, LLC

(57) ABSTRACT

A device whose location is to be determined (target device) generates a plurality of frames (messages) and time of departure (TOD) timestamp information indicating when the target device transmits the plurality of frames in a sequence or burst. The target device transmits the plurality of frames and the TOD information, wherein the plurality of frames are transmitted such that at least two of the frames are on different radio frequency (RF) channels. Within a sequence or burst (or across multiple sequences or bursts), multiple widely spaced transmissions on the same channel are included to allow for estimation of the crystal frequency offset of the transmitting device. The TOD information included in the transmitted packets allows devices that receive the packets not to change their channels of operation solely for the purpose of receiving packets from the device to be located.

35 Claims, 9 Drawing Sheets

U.S. PATENT DOCUMENTS

| | | |
|---|---|---|
| 6,522,887 B2 | 2/2003 | Larsson et al. |
| 6,885,969 B2 * | 4/2005 | Sahinoglu .................... 702/150 |
| 7,006,838 B2 | 2/2006 | Diener et al. |
| 7,426,156 B1 * | 9/2008 | Bahder ............................ 368/46 |
| 7,725,218 B2 * | 5/2010 | Hamrick et al. ................... 701/2 |
| 2002/0098852 A1 * | 7/2002 | Goren et al. .................. 455/456 |
| 2004/0198381 A1 | 10/2004 | Siegel et al. |
| 2005/0003828 A1 | 1/2005 | Sugar et al. |
| 2005/0193149 A1 * | 9/2005 | Boyd ............................ 709/248 |
| 2008/0248822 A1 * | 10/2008 | Jarvinen et al. ............... 455/509 |

FOREIGN PATENT DOCUMENTS

| | | |
|---|---|---|
| WO | 0241545 A2 | 5/2002 |
| WO | 0241651 A2 | 5/2002 |
| WO | 02054813 A1 | 7/2002 |
| WO | 2009020952 A1 | 2/2009 |

* cited by examiner

INSERTING TIME OF DEPARTURE INFORMATION IN FRAMES TO SUPPORT MULTI-CHANNEL LOCATION TECHNIQUES

CROSS REFERENCE TO RELATED APPLICATION

This application claims priority to U.S. Provisional Patent Application No. 61/044,070, filed Apr. 11, 2008, the entirety of which is incorporated herein by reference.

BACKGROUND

Time difference of arrival (TDOA) is a powerful location technology useful to determine the location of a wireless device based on signals or emissions that the wireless device makes. A device sends a frame and its time of arrival (TOA) is detected by synchronized devices, e.g., access point (AP) devices in a wireless local area network (WLAN). The TOA of the frame received at multiple APs is enough information to compute an estimate of the physical location of the device when it transmitted the frame.

However, in order to perform the TDOA computations, all the APs need to receive the same frame. This is not always the case due to the fact that, for example, APs operate on different channels at any given time and there are collisions from signals from multiple WLAN devices, etc. What is needed is a simple way for APs to remain on their preferred channels yet receive frames from devices so as to contribute to a TDOA location computation in order to locate that device.

DESCRIPTION OF EXAMPLE EMBODIMENTS

Overview

Figure 1:
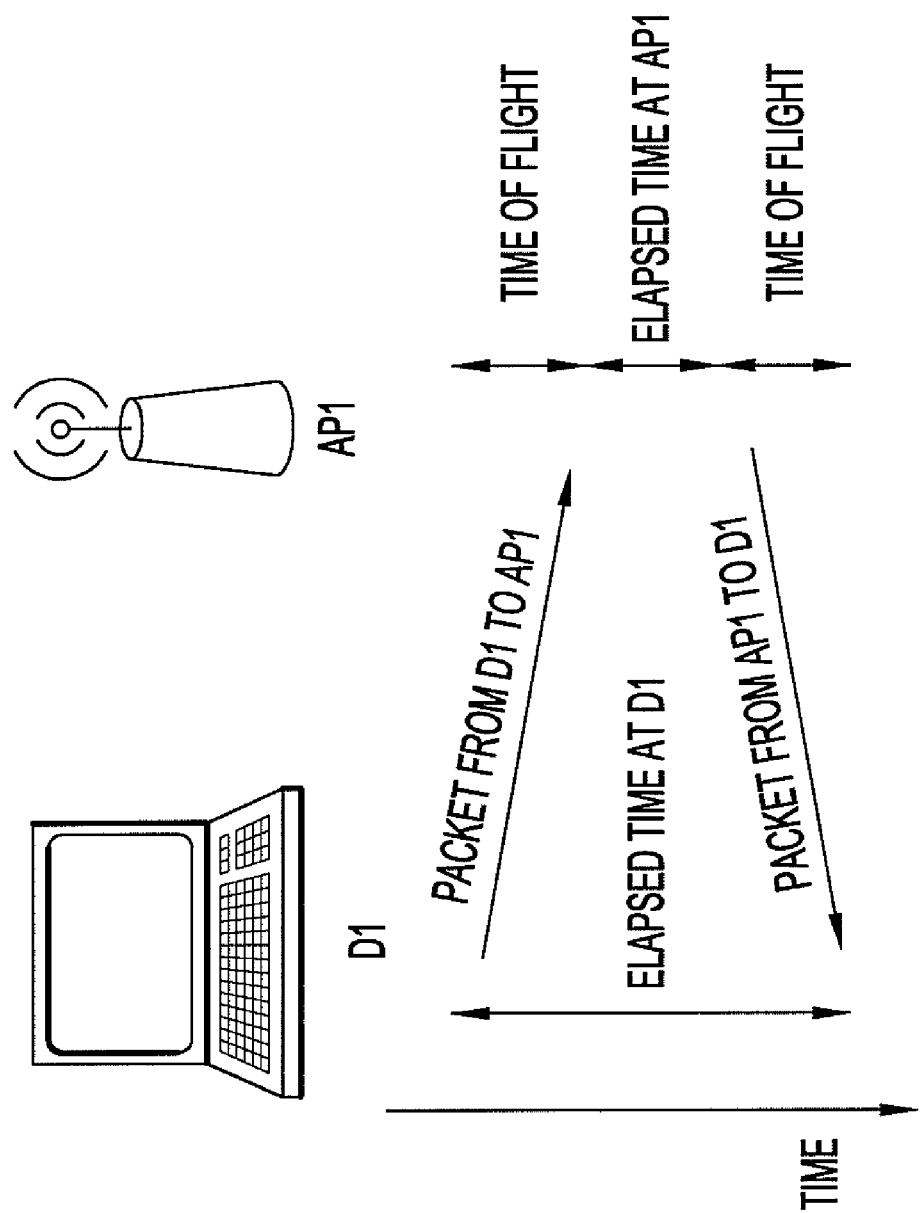
FIG. 1 is an example of a block diagram depicting time-of-flight of radio frequency (RF) signals for use in locating a device based on its RF transmissions.

The expansion of services provided in wireless environments such as wireless local area networks (WLANs) to include data and voice have imposed requirements on access points (APs) to operate on different radio frequency (RF) channels. Consequently, location techniques such as time difference of arrival (TDOA) are more difficult to implement because current TDOA location techniques rely on the APs all operating on the same channel. The techniques described herein add very simple logic/functionality to devices whose locations are to be determined (herein referred to as "target device") so that APs can remain on their "natural" channels yet support TDOA location techniques. Specifically, a target device generates a plurality of frames (messages) and time of departure (TOD) timestamp information indicating when the target device transmits the plurality of frames in a sequence or burst. The target device transmits the plurality of frames and the TOD information, wherein the plurality of frames are transmitted such that at least two of the frames are on different radio frequency (RF) channels. Within a sequence or burst (or across multiple sequences or bursts), multiple widely spaced transmissions on the same RF channel are included to allow for estimation of the crystal frequency offset of the target device.

These techniques may be employed in mesh location networks wherein some devices can transmit TOD timestamp information, some devices can both transmit and receive/process TOD timestamp information, and some devices are anchor points with known locations that can receive/process TOD timestamp information (and optionally also transmit TOD timestamp information).

One advantage of the techniques described herein is that the target device to be located transmits on a channel of an AP because it transmits the TOD information on multiple channels, and thus the target device's transmission will inevitably be received by a sufficient number of APs. Therefore, an AP does not have to be configured to change to a particular channel in order to receive signals from the target device for purposes of supporting a TDOA location computation. Additionally, the change required to make a target device TOD-enabled is minor and adds very small over-the-air overhead (e.g., a 32-bit timestamp and a few bytes of meta-data). Furthermore, these techniques are useful in propagation environments where the line-of-sight signal component from the target device and the AP cannot be determined without placing a significant processing burden on the target device.

As is known in the art, RF signals travel at the speed of light (c); about 1 ft per nanosecond. If a signal travels directly from transmitter to receiver, and its time of flight can be measured, then the distance between transmitter and receiver can be determined. With measurements from more receivers, such as an 802.11 AP, the location of the transmitter can be calculated. Nevertheless, measuring absolute time of flights is difficult since the transmitter and receiver clocks are unsynchronized.

Reference is now made to FIG. 1. Time of arrival (TOA) or client-based location systems are easiest to visualize. The target device D1 transmits to an infrastructure device e.g., AP1. The infrastructure device responds quickly and also reports the duration between the reception and transmission. Meanwhile, the target device also computes the time elapsed between its transmission and its reception of the infrastructure device's response. As shown in FIG. 1, the elapsed time on the target device D1 minus the elapsed time on the AP1 equals the time the RF signal spent traveling between the two devices, and this time can then be used to compute the location of the target device D1.

Figure 2:
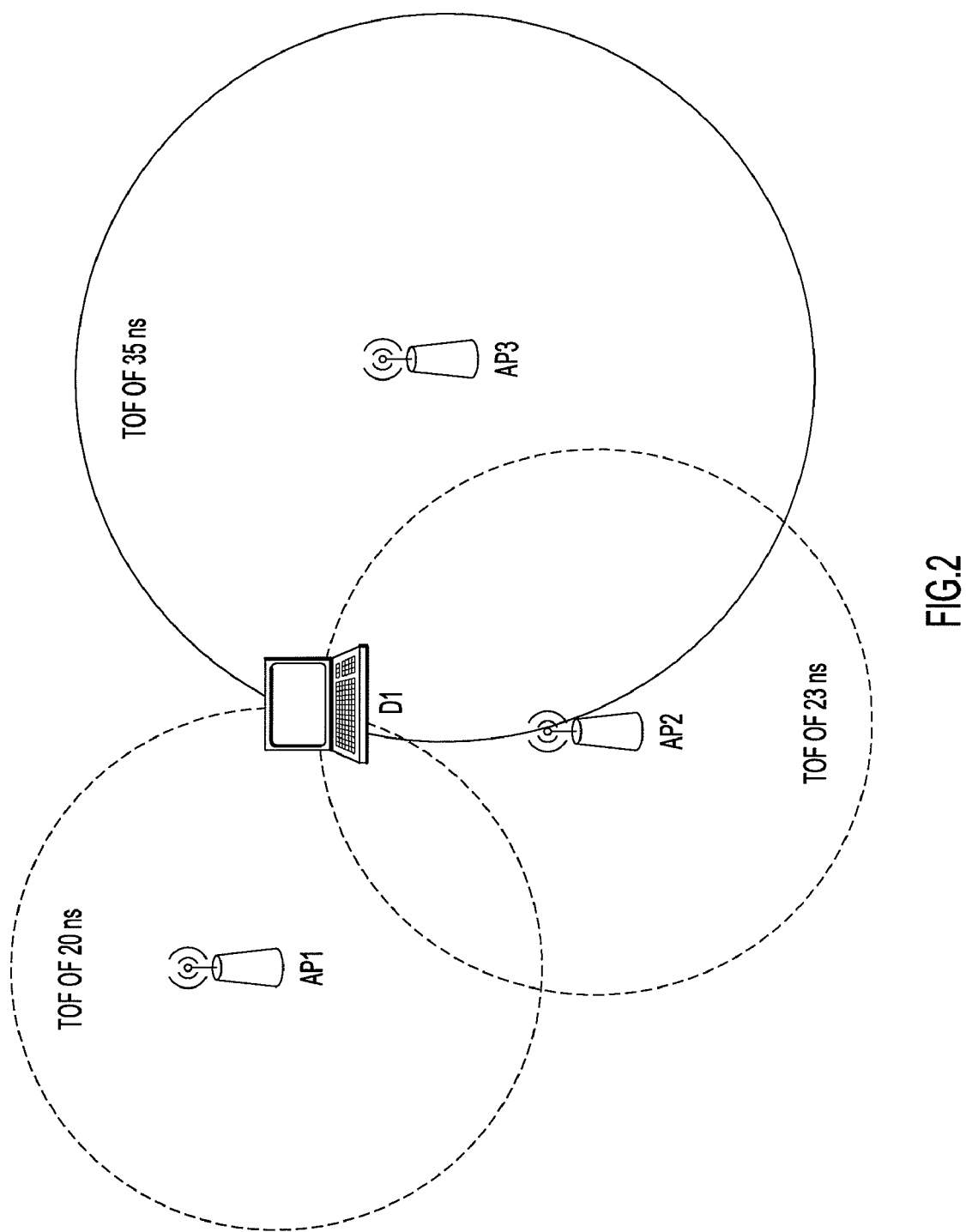
FIG. 2 illustrates an example of TOA location technique.
Figure 3:
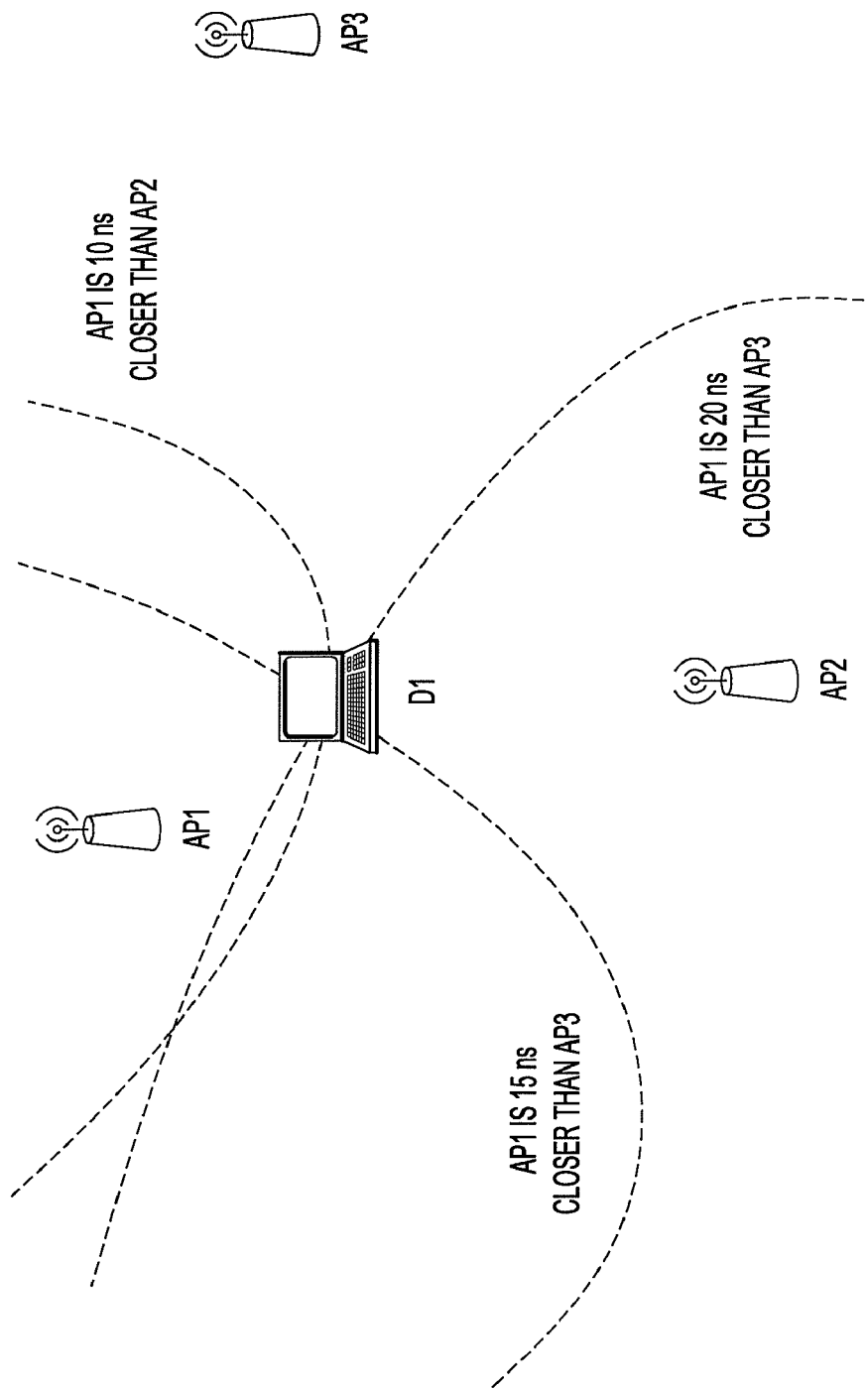
FIG. 3 illustrates an example of a TDOA location technique.

Location systems that use time stamp measurements fall into two broad categories distinguished by the form of the location system of equations employed. The equations can be cast in a system of range measurements or as a system of range difference measurements. The location is determined by the intersection of circles (spheres in three dimensions) for the range measurement equations as depicted in FIG. 2, or by a hyperbola (hyperboloids in three dimensions) for the range difference equations as depicted in FIG. 3.

In the case of range measurement location systems, the ranges between each AP and target device can be obtained from separate client transmissions. Therefore, APs in such a system can operate on different RF channels. By contrast, range difference location systems require that TOA measurements at each AP are made on exactly the same frame. In this way the unknown TOD information associated with the transmission from the target device is canceled in the range difference equations leaving only the location of the target device as an unknown.

The terms "frame" and "packet" are used herein in connection with various examples of the techniques that involve use of the IEEE 802.11 communication standard. In general, the signals transmitted by the target device (that contain TOD information) may be in any form and consequently the term "message" is used herein to more generically describe any type of signal format that contains the TOD information, and "message" is meant to include a frame, packet or other data encapsulating entity for use in communicating from one device to another.

More specifically, range measurements can be obtained by measuring (and filtering) the round-trip times of reflected signals (radar) or transmitted frames (e.g. frame and acknowledgement, i.e., ACK), or by two way ranging measurements that include both TOD and TOA timestamps. However, the use of round-trip measurements is impractical or inaccurate in WLAN systems. Two way range measurement in systems that utilize TOD and TOA process a set of four measurements made between each target device and receiving device (referred to herein as a "sensor"), e.g., an AP, {TOD_sensor, TOA_target, TOD_target, TOA_sensor}, obtained from two frame exchanges. In the first frame exchange the sensor transmits to the target, {TOD_sensor, TOA_target}. In the second frame exchange the target device transmits to the sensor, {TOD_target, TOA_sensor}. This set of four measurements can be reduced to two if the target device and sensors are time synchronized which is generally not the case. The complete set of four measurements allows the range to be solved independent of the clock offsets assuming that the second frame exchange occurs shortly after the first. In order to obtain an accurate measure of the range between the sensor and target device the TOA time stamps must be of the line-of-sight path, not a multipath reflection. This requirement places a significant signal processing burden on the target device.

The benefit of range measurement systems is the flexibility to have or allow all APs to operate on different frequency channels. The disadvantage of range measurement location systems is the need for complex signal processing on the target device.

On the other hand, range difference systems require no additional signal processing on the target, and perform location computations independent of target device cooperation. The drawback of these systems is that all APs must time stamp the exact same frame received from the target device, and this requires all APs to be on the same RF channel.

The system and techniques described herein utilize the TOD information in a unique way with a range difference location problem formulation. More to the point, the techniques described herein exploit the benefits of a range difference system in that the complex TOA signal processing on the target device is no longer required, and at the same time enjoy the benefits of a system of range equations formulation that do not require APs to be on the same RF channel.

Figure 4:
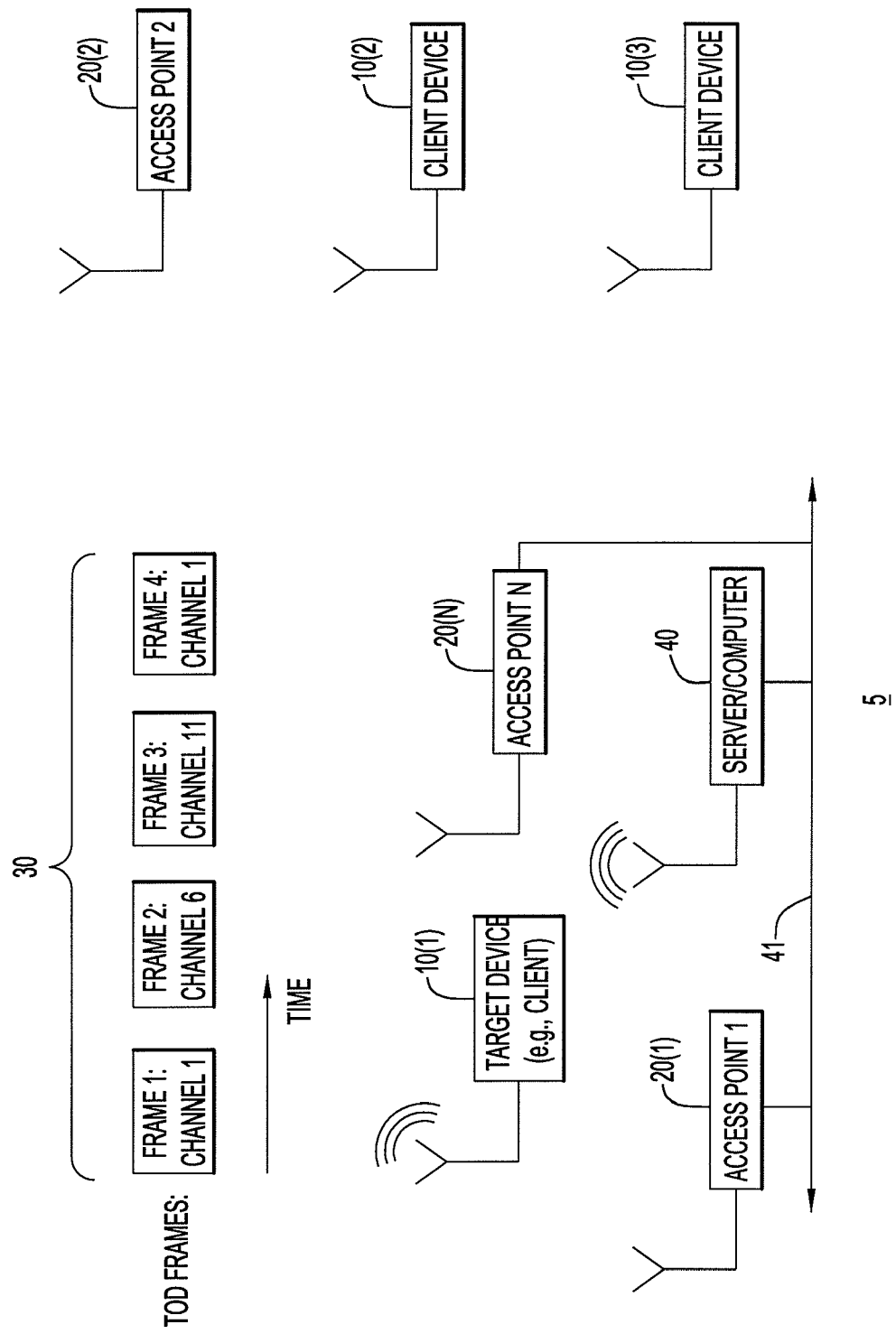
FIG. 4 illustrates a block diagram of a wireless communication environment in which a device whose location is to be determined inserts time of departure (TOD) information in frames that it transmits to facilitate a TDOA location technique.
Figure 5:
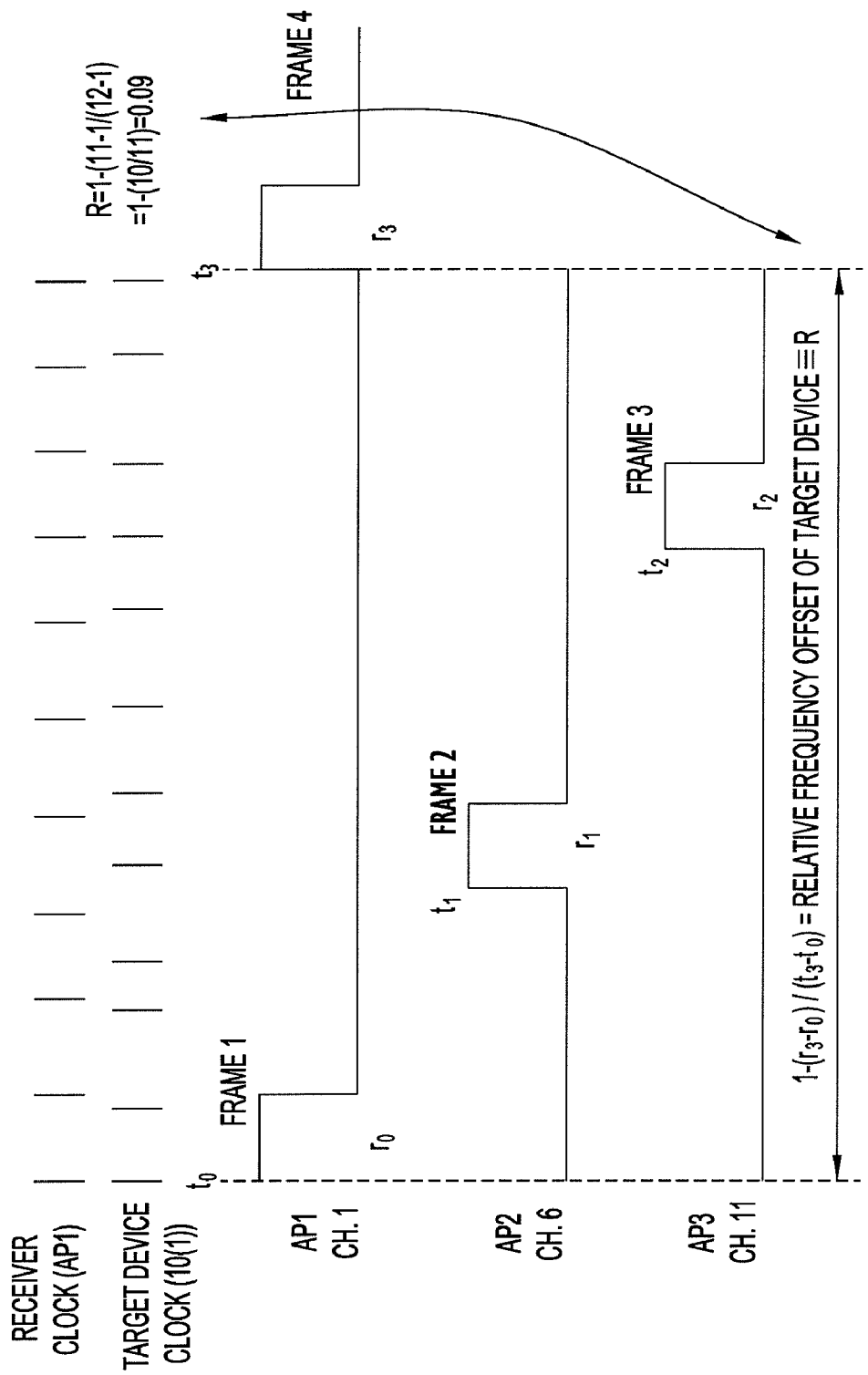
FIG. 5 is a timing diagram that depicts an example of a technique that a device may employ to transmit TOD information.

Referring now to FIGS. 4 and 5, one example for deploying and implementing the location techniques is now described. FIG. 4 shows a wireless network environment 5 comprising a target device 10(1), such as a WLAN client device, other client devices 10(2) and 10(3) and a plurality APs 20(1)-20(N). The target device 10(1) is the device whose location is to be determined using the techniques described herein.

For purposes of the following description, the target device 10(1) is enabled to perform a transmit (TX) TOD transmission sequence shown at reference numeral 30 in FIG. 4. This target device 10(1) is referred to as a "TX-TOD enabled device." A TX-TOD enabled device can transmit location frames on different operating channels for reception by a plurality of APs (several, but not necessarily all of the APs 20(1)-20(N)) such that the TX-TOD-enabled device location can be recovered via appropriately modified TDOA calculations described hereinafter.

In the following description, an example is provided in which the target device 10(1) and the APs 20(1)-20(N) are compliant with the IEEE 802.11 protocols. However, this is not required. The TX-TOD enabled device may or may not operate in compliance with the IEEE 802.11 protocol(s), e.g. WiMAX. Moreover, a TX-TOD-enabled device may be a device that is a non-AP 802.11 station (STA) (i.e., a device implementing a subset of a true 802.11 STA) or an 802.11 AP.

At the receiving end, the term "RX-TOD enabled device" refers to a device that is enabled to process the TOD transmission sequence from a TX-TOD-enabled device. In the example shown in FIG. 4, the APs 20(1)-20(N) are all RX-TOD enabled devices. More generally, however, a RX-TOD enabled device may be an 802.11 STA (client), non-AP STAs, described above, or 802.11 APs. An 802.11 client (STA) may simultaneously be TX-TOD-enabled and RX-TOD-enabled. FIG. 4 shows an example where the TX-TOD-enabled target device 10(1) is a client device (STA) and the RX-TOD enabled devices are APs. It is to be understood, however, that other examples may involve clients that are TX-TOD-enabled and RX-TOD-enabled and non-AP STAs TX-TOD-enabled and RX-TOD-enabled, which form location meshes together with APs that are TX-TOD and RX-TOD-enabled and which act as "anchor" points.

The location computations may be performed at an RX-TOD enabled device provided the device has access to data from other RX-TOD enabled devices and also has a data processor (e.g., computer) that is configured (with appropriate software or firmware) to perform the location computations. Alternatively, the data associated with reception of frames from the target device can be offloaded to a server or computer 40 via the WLAN or a wireline network 41 for computing the location of the target device.

An example of a technique for transmitting TOD transmission sequence 30 is now further described with reference to FIG. 5. FIG. 5 shows an example where the TOD transmission sequence 30 comprises frames 1-4, where frame 1 is on a first channel (e.g., channel 1 in the unlicensed 2.4 GHz band), frame 2 is on a second channel (e.g., channel 6), frame 3 is on a third channel (e.g., channel 11) and then frame 4 is on channel 1. It should be understood that the TOD transmission sequence 30 may comprise more than 4 frames. Since at least two of the frames in the sequence 30, separated by a time interval, are on the same channel, e.g., channel 1, information can be derived about the frequency offset of the crystal oscillator of the target device to make adjustments in the TDOA location computations.

The following terminology is defined to facilitate understanding of FIG. 5.

$t_i$ refers to the transmit TOD timestamp at the transmitting device, e.g., target device 10(1), where in the example of FIG. 5, i=0 to 3.

$r_i$ refers to the receive timestamp (i.e., TOA) at the receiving at any one of the APs 20(1) to 20(N) shown in FIG. 4. In FIG. 5, three different APs are tuned to three respective channels 1, 6 and 11. FIG. 5 also shows that a relative clock offset rate of change R can be computed as:

$$R=1-(r_3-r_0)/(t_3-t_0) \quad (1)$$

The clock offset rate of change R is used to convert the $t_i$ TOD timestamps to the same clock time reference by removing the clock drift between transmit times. This is done by the computation:

$$t_{i[new]}=t_{i[old]}-R(t_{i[old]}-t_0) \quad (2)$$

The above normalizing equations translate each TOD to the same relative point in time so that each individual translated transmission will have the same clock offset from the APs. The clock offset is then cancelled when taking a difference of the range equations.

Because the frames in the sequence 30 are transmitted on different channels, they will be received by different ones of the APs 20(1)-20(N) depending on the channel a particular AP is operating on at the time that the target device transmits the sequence 30. As a result, for purposes of the computations, one can "pretend" that one frame was transmitted on one channel that is heard by all of APs, in which case the relevant data for each AP (0-N) is:

$$\left. \begin{array}{l} r_0 - t_0 \\ r_1 - t_1 \\ r_N - t_N \end{array} \right\} \quad (3)$$

Following the translation in (2) the TODs are each offset in time from the AP clocks by the same value dt.

$$\left. \begin{array}{l} r_0 - (t_0 + dt) \\ r_1 - (t_1 + dt) \\ r_N - (t_N + dt) \end{array} \right\} \quad (4)$$

The above equations are proportional by the speed of light c to the ranges between each AP and the target device.

$$\left. \begin{array}{l} r_0 - (t_0 + dt) = d_0/c \\ r_1 - (t_1 + dt) = d_1/c \\ r_N - (t_N + dt) = d_N/c \end{array} \right\} \quad (5)$$

where $d_N$ is the distance between the $AP_N$ and the target device.

By taking the difference between the range equations (5) the unknown offset dt is removed, and the unknown target device location is presented in terms of the measured TOAs and TODs.

$$\left. \begin{array}{l} (r_1 - t_1) - (r_0 - t_0) = (d_1 - d_0)/c \\ (r_2 - t_2) - (r_0 - t_0) = (d_2 - d_0)/c \\ (r_N - t_N) - (r_0 - t_0) = (d_N - d_0)/c \end{array} \right\} \quad (6)$$

which is a set of TDOA equations obtained from measurements taken at different times and on different AP channels.

The TOD information that is embedded into one or more of the frames in the sequence 30 may be the absolute or relative (to some arbitrary point in time such as a counter wrapping) time of departure of the frame, where time may be presented as a value with units of seconds, or some other units such as the inverse of a suitable oscillator, such as a 44 MHz oscillator, for example.

The TOD information may be sent in the individual frames, in prior or subsequent frames, in intermittent summary frames that record the sequence number, fragment number or some other frame indicator that is unique or unique-with-high-probability, or by some other communication mechanism, possibly involving duplication of information. Thus, the TOD information for each message may be embedded within each respective message, or the TOD information for multiple (or all) of the messages may be embedded in a message (e.g., a summary message or one of the plurality of messages). The so-called summary message may be sent before, during or after the burst of the plurality of messages. It is not necessary for the target device to transmit TOD information in every frame.

The following text describes an example in which the TOD information is sent in the frame. An advantage of sending the TOD information in the frame is that it simplifies processing and decreases latency, particularly when the target device is mobile.

In this example, the target device 10(1) inserts a TOD timestamp into specific transmitted frames (e.g., in the context of the IEEE 802.11 communication protocol, such as 802.11 amendment TGv, one or more of CLIENTv2, modified S60 path loss measurement frames, TDOA-enabled S60 frames, 802.11v presence frames, probe requests, and the set of frames that support an optional number of information elements (IEs)). These frames are transmitted as a burst (sequence) across multiple channels, to be received by APs on different channels, as described above in connection with FIGS. 4 and 5. The target device may also employ RF multicast by transmitting frames at the same time on different channels, for example, frames 1, 2, and 3 of FIG. 5 could be transmitted at the same with frame 4 transmitted at a different time.

As explained above, the burst or sequence may involve transmitting the first and last frame on the same channel so that the crystal frequency offset of the target device can be determined by the APs. However, more generally, the sequence of frames may comprise repeated, widely spaced transmissions on the same channel, perhaps from one burst (sequence) or across multiple bursts or sequences, to allow for estimation of the crystal frequency offset of the target device.

The data generated by the APs from reception of the TOD information contained in the frames they receive allows for estimation of the target device's crystal offset. The TOD timestamps are converted to a common time reference from the APs time references (using the computation of equation (2) involving the relative frequency offset parameter R described above). The TOD information is still offset from the AP time reference by a constant. The differences in the converted TOD timestamps are subtracted from differences in the corresponding TOAs using the computations of equations (4), and thereby allowing for merging of the multi-channel TOD/TOA information into TDOA location computations. The problem becomes akin to just one frame being transmitted on one channel and being heard by multiple APs as if they were operating on one channel, e.g. by using equations (6).

Figure 6:
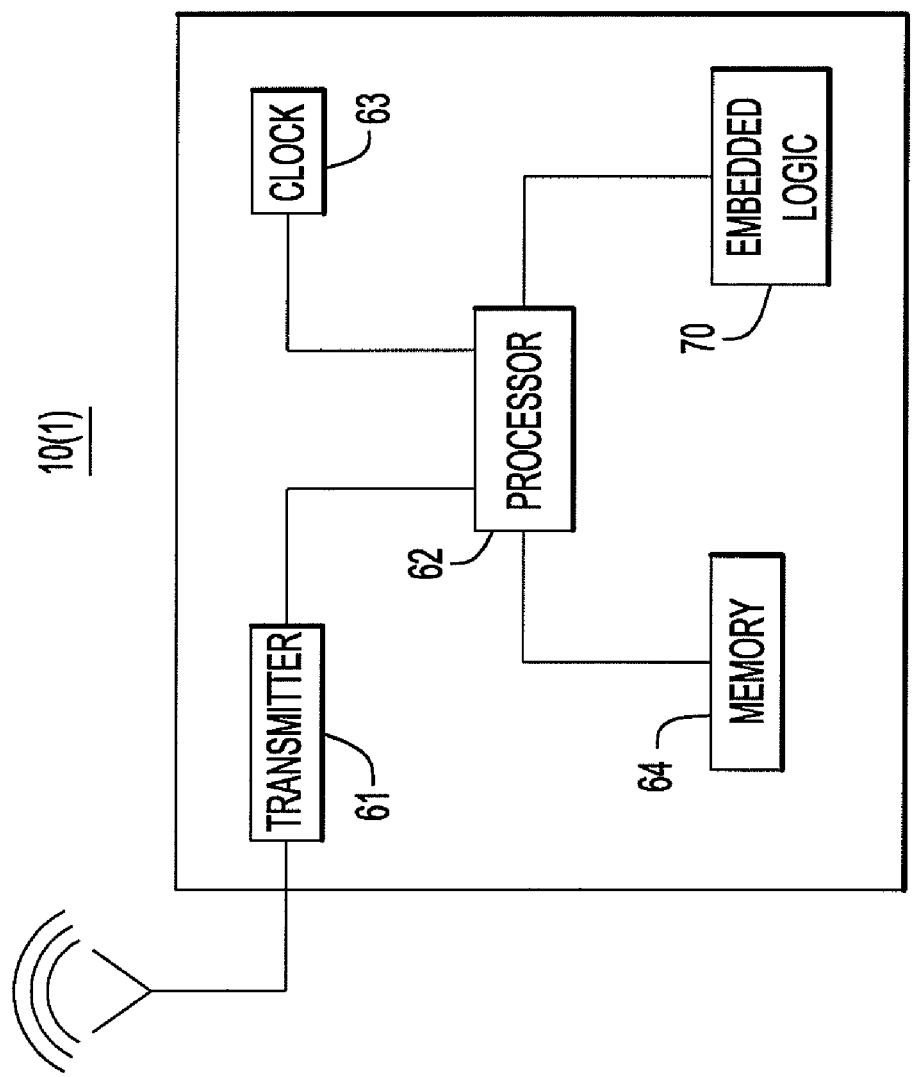
FIG. 6 is an example block diagram of a device that is configured to insert TOD information in frames it transmits.

Turning now to FIG. 6, a block diagram of an example of a target device 10(1) is shown. In one embodiment, the target device 10(1) includes a transmitter 61, a clock 63, a memory 64, and embedded logic 70 all coupled to a processor 62. The processor 62 uses embedded logic 70 and the clock 63 to generate frames with TOD information to be transmitted by transmitter 61. The memory 64 is accessible to the processor 62 for storage of data and program instructions. The embedded logic 70 may embody the instructions that enable the target device 10(1) to generate the transmission sequence 30 (FIGS. 4 and 5) containing the TOD information.

Figure 7:
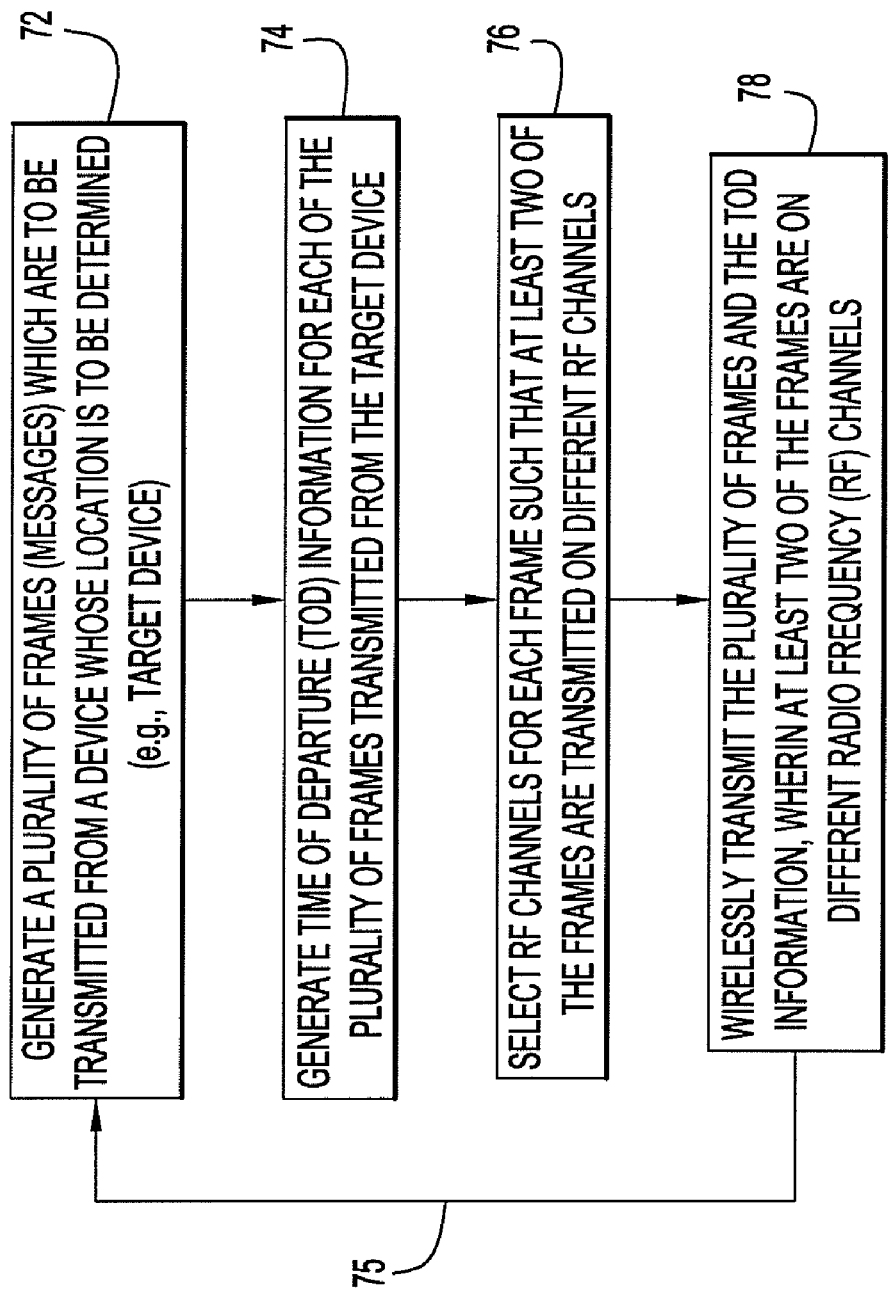
FIG. 7 is an example flow chart that depicts operations at a device for inserting TOD information into packets.

Referring to FIG. 7, the embedded logic 70 is further described by a flow chart that depicts the associated operations or functions of the target device 10(1) with respect to transmitting TOD information. At 72, the target device 10(1) generates a plurality of frames to be transmitted by the target device. For example, the frames may be any one of the IEEE 802.11 frame types mentioned above. At 74, the target device generates the TOD (timestamp) information and inserts it into a field of the frames generated at 72 as part of transmission sequence or burst. As described above, the TOD information may be inserted in the individual frames, in prior or subsequent frames, in intermittent summary frames that record the sequence number, fragment number or some other frame indicator. At 76, the target device 10(1) selects the RF channel for each frame. Frame generation and channel selection are coordinated so that at least two frames containing TOD information are spaced apart in time and are transmitted on the same RF channel to enable derivation of a frequency offset of an oscillator in the target device 10(1). At 78, the respective frames are transmitted on their corresponding selected RF channels as part of transmission sequence 30. As shown at 75 the process 70 repeats itself as required either on demand or on occasion (e.g., periodically) in order to compute the location of the target device 10(1).

Figure 8:
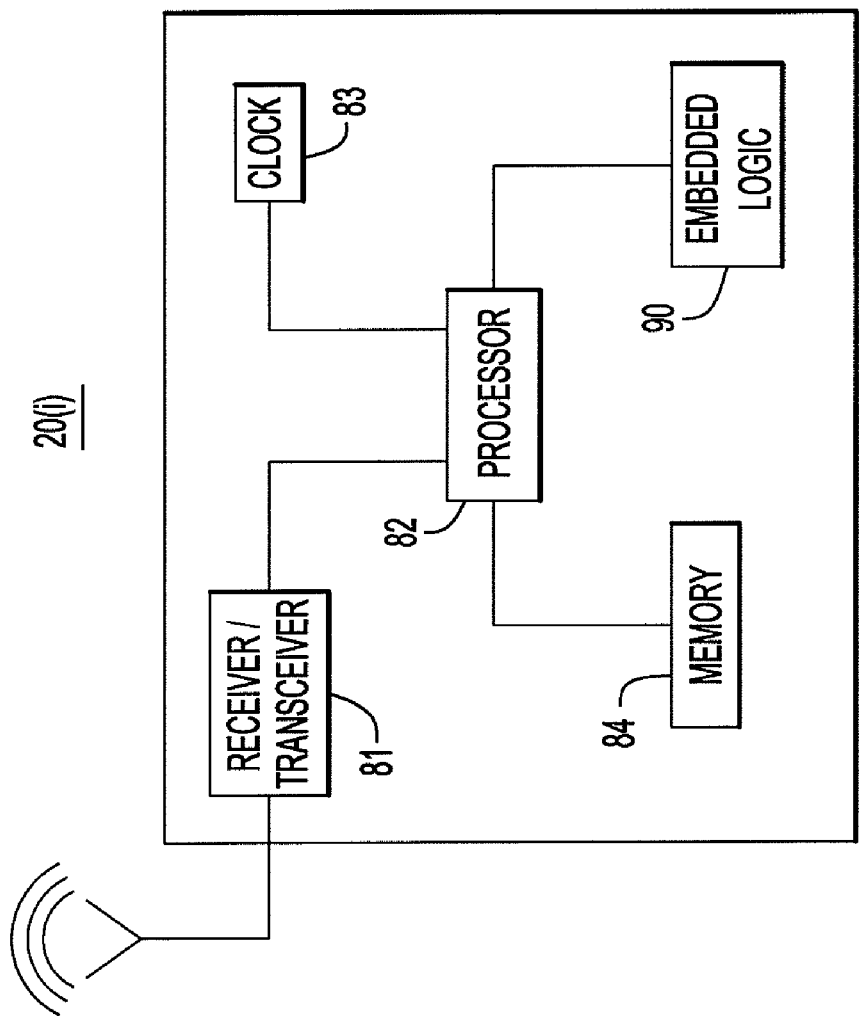
FIG. 8 is an example block diagram of device that is configured to receive frames containing TOD information from a device whose location is to be determined.

FIG. 8 illustrates an example of a block diagram of an AP 20(i) as one example of an RX-TOD enabled receiver. The AP 20(i) includes a receiver or transceiver 81, a clock 83, a memory 84, and embedded logic 90 all coupled to a processor 82. The processor 82 uses embedded logic 90 and the clock 83 to generate TOA information for frames received by the receiver or transceiver 81. The memory 84 is accessible to the processor 82 for storage of data and program instructions. An optional network interface card (not shown) for interfacing to a wireline network may be included in the AP 20(i). In the event that a RX-TOD enabled receiver device is capable only of receiving signals, it is understood that such a device would comprise a receiver and not a transceiver since it would not have transmit capabilities. In any event, the embedded logic 90 is configured to extract the TOD information from the frames in the transmission sequence that the AP 20(i) receives and also to determine the TOA of each of the frames it receives. The TOD information and TOA information for each received frame is the input to the location computations that are performed either by a data processor connected to one of the APs or by a third computing device such as the server 40 shown in FIG. 4.

Figure 9:
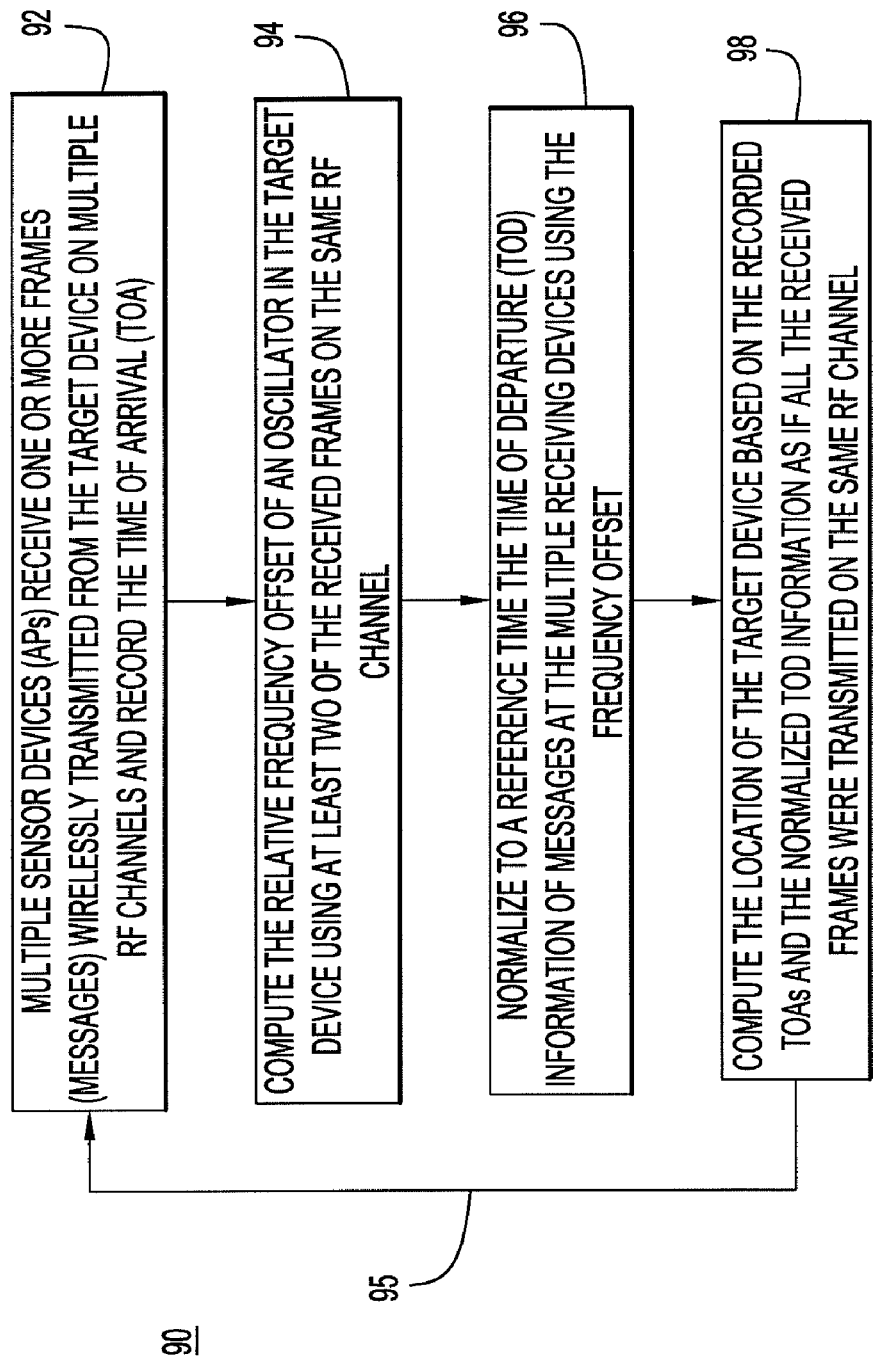
FIG. 9 is an example flow chart that depicts operations associated with processing the TOD information contained in received frames and computing the location of a device.

FIG. 9 illustrates a flow chart that depicts operations or functions when processing received frames with TOD information. At 92, multiple APs receive frames that contain TOD information from the target device on multiple RF channels and the APs extract and record the TOA information for the frame(s) that the respective APs receive. At 94 the relative frequency offset is computed using equation (1). At 96 the TODs are normalized using equation (2). Since the APs are synchronized, all normalized receive times behave as if they were all received on the same RF channel at $r_0$. At 98 TOAs $r_0$ through $r_N$ and normalized TODs $t_0$ though $t_N$ can be used for TDOA location computations using computations such as those above in equations (6). At 95 the logic repeats itself as required.

Many mechanisms to timestamp a frame are known in the art. In one example, each TX-TOD-enabled device maintains a 32-bit TOD timestamp counter that counts exactly at the digital-to-analog-converter (DAC) clock rate or some integer multiple thereof. At the lowest layer, frames are commonly transmitted in the baseband processor via a hardware finite state machine (FSM), for example. There is typically a state transition within the FSM, such that there is a fixed, constant delay between when the state transition occurs and when the frame is sent to the DACs. Thus, upon this state transition, the TX-TOD enabled device copies the value of the TOD timestamp counter into a TOD timestamp field. The field may be in the frame about to be sent, the next frame or in a summary frame. The TOD is used in a relative way, so the exact duration of the constant delay is unimportant.

Described herein are example embodiments. The concepts described herein may be embodied in other specific forms without departing from the spirit or essential characteristics thereof. The foregoing embodiments are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
generating a plurality of messages at a first device whose location is to be determined and time of departure (TOD) information that indicates when the respective messages are transmitted from the first device; and
wirelessly transmitting the plurality of messages and the TOD information from the first device, wherein the plurality of messages are transmitted such that at least two of the messages are on different radio frequency (RF) channels.

2. The method of claim 1, wherein transmitting further comprises transmitting at least two messages spaced apart in time on the same RF channel.

3. The method of claim 1, and further comprising generating the information representing the TOD information in terms of absolute time or relative time as measured from a counter, oscillator, clock, or other timing reference.

4. The method of claim 1, wherein generating the plurality of messages comprises including the TOD information within a field of at least one of the plurality of messages.

5. The method of claim 1, wherein generating comprises embedding the TOD information for each message within the respective message.

6. The method of claim 1, wherein generating comprises embedding the TOD information for the plurality of messages into a summary message that is transmitted by the first device.

7. The method of claim 1, and further comprising:
receiving one or more of the plurality of messages at multiple ones of a plurality of second devices; and
computing a location of the first device based on data associated with time of arrival (TOA) of the messages at multiple ones of the second devices and the information representing the TOD information associated with the plurality of messages.

8. The method of claim 7, wherein computing comprises computing an estimate of a frequency offset of an oscillator in the first device based on the TOAs of at least two messages that are transmitted on the same RF channel and the TOD information of the respective messages that are received at at least one of the second devices.

9. The method of claim 8, wherein computing comprises computing the location of the first device by normalizing to a reference time the TOD information for messages received at multiple second devices using the frequency offset and computing the location of the first device from the TOAs of the messages as if the plurality of messages were transmitted on the same RF channel.

10. The method of claim 7, wherein computing is performed at one or more third devices.

11. An apparatus comprising:
a controller that is configured to generate a plurality of messages and time of departure (TOD) information that indicates when the respective messages are transmitted from a first device; and
a transmitter coupled to the controller, wherein the transmitter is configured to wirelessly transmit the plurality of messages and the TOD information from the first device such that at least two of the messages are on different radio frequency (RF) channels.

12. The apparatus of claim 11, wherein the transmitter is further configured to transmit at least two messages spaced apart in time on the same RF channel.

13. The apparatus of claim 11, wherein the controller generates the information representing the TOD information in terms of absolute time or relative time as measured from a counter, oscillator, clock, or other timing reference.

14. The apparatus of claim 11, wherein the controller is configured to include the TOD information within a field of at least one of the messages.

15. The apparatus of claim 11, wherein the controller is configured to embed the TOD information for each message within the respective message.

16. The apparatus of claim 11, wherein the controller is configured to embed the TOD information for the plurality of messages into a summary message.

17. Logic encoded in one or more non-transitory tangible media for execution and when executed operable to:
generate a plurality of messages which are to be transmitted from a first device whose location is to be determined;
generate time of departure (TOD) information that indicates when the respective messages are transmitted from the first device; and
select radio frequency (RF) channels for wireless transmission of the plurality of messages such that at least two of the messages are transmitted on different RF channels.

18. The logic of claim 17, wherein the logic that selects comprises logic that further selects the same RF channel for wireless transmission of at least two messages spaced apart in time.

19. The logic of claim 17, and further comprising logic that generates the TOD information in terms of absolute time or relative time as measured from a counter, oscillator, clock, or other timing reference.

20. The logic of claim 17, wherein the logic that generates the plurality of messages comprises logic that includes the TOD information within a field of at least one of the messages.

21. The logic of claim 17, and further comprising logic that embeds the TOD information for each message within the respective messages.

22. The logic of claim 17, and further comprising logic that embeds the TOD information for each of the plurality of messages within a message.

23. A method comprising:
receiving data representing time of arrival (TOA) of messages that are wirelesly transmitted on multiple radio frequency (RF) channels by a first device and received at multiple ones of a plurality of second devices, and time of departure (TOD) data that indicates when each of the plurality of messages was transmitted by the first device; and
computing a location of the first device based on the TOA of the messages and the TOD data.

24. The method of claim 23, wherein computing comprises computing an estimate of a frequency offset R of an oscillator in the first device based on the TOAs of at least two messages that are transmitted on the same RF channel and the TOD information for the plurality of messages that are received at at least one of the second devices.

25. The method of claim 23, wherein computing comprises computing the location of the first device by normalizing to a reference time the TOD information for messages received at multiple second devices using the frequency offset R and computing the location of the first device from the TOAs of the messages as if the messages were transmitted on the same RF channel.

26. The method of claim 25, wherein computing is performed at one or more third devices.

27. The method of claim 1, wherein wireless transmitting comprises wirelessly transmitting the plurality of messages on different frequency channels so that different second devices operating on different frequency channels receive different ones of the plurality of messages and determine time of arrival of received messages to enable computation of the location of the first device using the times of arrival of the messages at different second devices and times of departure of the messages.

28. The apparatus of claim 11, wherein the controller is configured to control the transmitter to transmit the plurality of messages on different frequency channels so that different second devices operating on different frequency channels receive different ones of the plurality of messages and determine time of arrival of received messages to enable computation of the location of the first device using the times of arrival of the messages at different second devices and times of departure of the messages.

29. The logic of claim 17, wherein the logic that selects comprises logic that selects different frequency channels so that different second devices operating on different frequency channels receive different ones of the plurality of messages and determine time of arrival of received messages to enable computation of the location of the first device using the times of arrival of the messages at different second devices and times of departure of the messages.

30. A system comprising:
a first device comprising:
a controller configured to generate a plurality of messages and time of departure (TOD) information that indicates when the respective messages are transmitted from the first device;
a transmitter coupled to the controller, wherein the transmitter is configured to wirelessly transmit the plurality of messages and the TOD information from the first device such that at least two of the messages are on different radio frequency (RF) channels;
a plurality of second devices configured to receive one or more of the plurality of messages; and
a server computer in communication with the plurality of second devices and configured to compute a location of the first device based on data associated with time of arrival (TOA) of the messages at multiple ones of the second devices and the information representing the TOD information associated with the plurality of messages.

31. The system of claim 30, wherein the controller is configured to generate the information representing the TOD information in terms of absolute time or relative time as measured from a counter, oscillator, clock, or other timing reference.

32. The system of claim 30, wherein the controller is configured to include the TOD information within a field of at least one of the messages.

33. The system of claim 30, wherein the controller is configured to embed the TOD information for the plurality of messages into a summary message.

34. The system of claim 30, wherein the server computer is configured to compute an estimate of a frequency offset of an oscillator in the first device based on the TOAs of at least two messages that are transmitted on the same RF channel and the TOD information of the respective messages that are received at at least one of the second devices.

35. The system of claim 34, wherein the server computer is configured to compute the location of the first device by normalizing to a reference time the TOD information for messages received at multiple second devices using the frequency offset and to compute the location of the first device from the TOAs of the messages as if the plurality of messages were transmitted on the same RF channel.

* * * * *